US010698939B2

(12) United States Patent
Raichelgauz et al.

(10) Patent No.: US 10,698,939 B2
(45) Date of Patent: Jun. 30, 2020

(54) SYSTEM AND METHOD FOR CUSTOMIZING IMAGES

(71) Applicant: Cortica, Ltd., Tel Aviv (IL)

(72) Inventors: Igal Raichelgauz, Tel Aviv (IL); Karina Odinaev, Tel Aviv (IL); Yehoshua Y Zeevi, Haifa (IL)

(73) Assignee: CORTICA LTD, Tel Aviv (IL)

( * ) Notice: Subject to any disclaimer, the term of this patent is extended or adjusted under 35 U.S.C. 154(b) by 486 days.

(21) Appl. No.: 15/613,819

(22) Filed: Jun. 5, 2017

(65) Prior Publication Data

US 2017/0270109 A1 Sep. 21, 2017

Related U.S. Application Data

(63) Continuation-in-part of application No. 14/050,991, filed on Oct. 10, 2013, now Pat. No. 10,380,267, and
(Continued)

(51) Int. Cl.
*G06F 17/00* (2019.01)
*G06F 16/41* (2019.01)
(Continued)

(52) U.S. Cl.
CPC .............. *G06F 16/41* (2019.01); *G06F 16/14* (2019.01); *G06F 16/152* (2019.01); *G06F 16/48* (2019.01);
(Continued)

(58) Field of Classification Search
CPC .......... G06F 16/41; G06F 16/14; G06F 16/48; G06F 16/152; Y10S 707/99943; Y10S 707/99948
See application file for complete search history.

(56) References Cited

U.S. PATENT DOCUMENTS

| 4,733,353 A | 3/1988 | Jaswa |
| 4,932,645 A | 6/1990 | Schorey et al. |

(Continued)

FOREIGN PATENT DOCUMENTS

| WO | 0231764 | 4/2002 |
| WO | 2003005242 A1 | 1/2003 |

(Continued)

OTHER PUBLICATIONS

Boari et al, "Adaptive Routing for Dynamic Applications in Massively Parallel Architectures", 1995 IEEE, Spring 1995.
(Continued)

*Primary Examiner* — Tyler J Torgrimson
(74) *Attorney, Agent, or Firm* — Oren Reches

(57) ABSTRACT

A method for customizing an image. The method includes causing generation of at least one signature for an input image, wherein each signature represents a concept, wherein each concept is a collection of signatures and metadata representing the concept; comparing the generated at least one signature to at least one signature representing at least one common visual attribute among a plurality of reference images; determining, based on the comparison, whether to customize the input image; and customizing the input image with respect to at least one of the at least one common visual attribute, when it is determined to customize the input image.

19 Claims, 6 Drawing Sheets

Related U.S. Application Data a continuation-in-part of application No. 13/602,858, filed on Sep. 4, 2012, now Pat. No. 8,868,619, which is a continuation of application No. 12/603,123, filed on Oct. 21, 2009, now Pat. No. 8,266,185, which is a continuation-in-part of application No. 12/084,150, filed as application No. PCT/IL2006/001235 on Oct. 26, 2006, now Pat. No. 8,655,801, said application No. 12/603,123 is a continuation-in-part of application No. 12/195,863, filed on Aug. 21, 2008, now Pat. No. 8,326,775, which is a continuation-in-part of application No. 12/084,150, filed on Apr. 7, 2009, now Pat. No. 8,655,801, said application No. 12/603,123 is a continuation-in-part of application No. 12/348,888, filed on Jan. 5, 2009, now Pat. No. 9,798,795, which is a continuation-in-part of application No. 12/084,150, filed on Apr. 7, 2009, now Pat. No. 8,655,801, and a continuation-in-part of application No. 12/195,863, filed on Aug. 21, 2008, now Pat. No. 8,326,775, said application No. 12/603,123 is a continuation-in-part of application No. 12/538,495, filed on Aug. 10, 2009, now Pat. No. 8,312,031, which is a continuation-in-part of application No. 12/084,150, filed on Apr. 7, 2009, now Pat. No. 8,655,801, and a continuation-in-part of application No. 12/195,863, filed on Aug. 21, 2008, now Pat. No. 8,326,775, and a continuation-in-part of application No. 12/348,888, filed on Jan. 5, 2009, now Pat. No. 9,798,795.

(60) Provisional application No. 62/345,882, filed on Jun. 6, 2016, provisional application No. 61/860,261, filed on Jul. 31, 2013.

(51) Int. Cl.
  *G06F 16/14* (2019.01)
  *G06F 16/48* (2019.01)

(52) U.S. Cl.
  CPC *Y10S 707/99943* (2013.01); *Y10S 707/99948* (2013.01)

(56) References Cited

U.S. PATENT DOCUMENTS

| | | | |
|---|---|---|---|
| 4,972,363 A | 11/1990 | Nguyen et al. | |
| 5,307,451 A | 4/1994 | Clark | |
| 5,568,181 A | 10/1996 | Greenwood et al. | |
| 5,806,061 A | 9/1998 | Chaudhuri et al. | |
| 5,852,435 A | 12/1998 | Vigneaux et al. | |
| 5,870,754 A | 2/1999 | Dimitrova et al. | |
| 5,873,080 A | 2/1999 | Coden et al. | |
| 5,887,193 A | 3/1999 | Takahashi et al. | |
| 5,940,821 A | 8/1999 | Wical | |
| 5,978,754 A | 11/1999 | Kumano | |
| 5,987,454 A | 11/1999 | Hobbs | |
| 6,038,560 A | 3/2000 | Wical | |
| 6,052,481 A | 4/2000 | Grajski et al. | |
| 6,076,088 A | 6/2000 | Paik et al. | |
| 6,122,628 A | 9/2000 | Castelli et al. | |
| 6,137,911 A | 10/2000 | Zhilyaev | |
| 6,144,767 A | 11/2000 | Bottou et al. | |
| 6,147,636 A | 11/2000 | Gershenson | |
| 6,240,423 B1 | 5/2001 | Hirata | |
| 6,243,375 B1 | 6/2001 | Speicher | |
| 6,243,713 B1 | 6/2001 | Nelson et al. | |
| 6,329,986 B1 | 12/2001 | Cheng | |
| 6,363,373 B1 | 3/2002 | Steinkraus | |
| 6,381,656 B1 | 4/2002 | Shankman | |
| 6,411,229 B2 | 6/2002 | Kobayashi | |
| 6,422,617 B1 | 7/2002 | Fukumoto et al. | |
| 6,493,692 B1 | 12/2002 | Kobayashi et al. | |
| 6,493,705 B1 | 12/2002 | Kobayashi et al. | |
| 6,523,022 B1 | 2/2003 | Hobbs | |
| 6,523,046 B2 | 2/2003 | Liu et al. | |
| 6,524,861 B1 | 2/2003 | Anderson | |
| 6,526,400 B1 | 2/2003 | Takata et al. | |
| 6,550,018 B1 | 4/2003 | Abonamah et al. | |
| 6,560,597 B1 | 5/2003 | Dhillon et al. | |
| 6,594,699 B1 | 7/2003 | Sahai et al. | |
| 6,601,060 B1 | 7/2003 | Tomaru | |
| 6,611,628 B1 | 8/2003 | Sekiguchi et al. | |
| 6,611,837 B2 | 8/2003 | Schreiber | |
| 6,618,711 B1 | 9/2003 | Ananth | |
| 6,643,620 B1 | 11/2003 | Contolini et al. | |
| 6,643,643 B1 | 11/2003 | Lee et al. | |
| 6,675,159 B1 | 1/2004 | Lin et al. | |
| 6,704,725 B1 | 3/2004 | Lee | |
| 6,728,706 B2 | 4/2004 | Aggarwal et al. | |
| 6,732,149 B1 | 5/2004 | Kephart | |
| 6,751,363 B1 | 6/2004 | Natsev et al. | |
| 6,754,435 B2 | 6/2004 | Kim | |
| 6,763,519 B1 | 7/2004 | McColl et al. | |
| 6,774,917 B1 | 8/2004 | Foote et al. | |
| 6,795,818 B1 | 9/2004 | Lee | |
| 6,804,356 B1 | 10/2004 | Krishnamachari | |
| 6,819,797 B1 | 11/2004 | Smith et al. | |
| 6,836,776 B2 | 12/2004 | Schreiber | |
| 6,845,374 B1 | 1/2005 | Oliver et al. | |
| 6,901,207 B1 | 5/2005 | Watkins | |
| 6,938,025 B1 | 8/2005 | Lulich et al. | |
| 6,970,881 B1 | 11/2005 | Mohan et al. | |
| 6,978,264 B2 | 12/2005 | Chandrasekar et al. | |
| 7,006,689 B2 | 2/2006 | Kasutani | |
| 7,013,051 B2 | 3/2006 | Sekiguchi et al. | |
| 7,043,473 B1 | 5/2006 | Rassool et al. | |
| 7,124,149 B2 | 10/2006 | Smith et al. | |
| 7,199,798 B1 | 4/2007 | Echigo et al. | |
| 7,215,828 B2 | 5/2007 | Luo | |
| 7,260,564 B1 | 8/2007 | Lynn et al. | |
| 7,277,928 B2 | 10/2007 | Lennon | |
| 7,296,012 B2 | 11/2007 | Ohashi | |
| 7,302,117 B2 | 11/2007 | Sekiguchi et al. | |
| 7,313,805 B1 | 12/2007 | Rosin et al. | |
| 7,346,629 B2 | 3/2008 | Kapur et al. | |
| 7,392,238 B1 | 6/2008 | Zhou et al. | |
| 7,406,459 B2 | 7/2008 | Chen et al. | |
| 7,441,037 B2 | 10/2008 | Saxena | |
| 7,450,740 B2 | 11/2008 | Shah et al. | |
| 7,523,102 B2 | 4/2009 | Bjarnestam et al. | |
| 7,526,607 B1 | 4/2009 | Singh et al. | |
| 7,536,384 B2 | 5/2009 | Venkataraman et al. | |
| 7,542,969 B1 | 6/2009 | Rappaport et al. | |
| 7,548,910 B1 | 6/2009 | Chu et al. | |
| 7,555,477 B2 | 6/2009 | Bayley et al. | |
| 7,555,478 B2 | 6/2009 | Bayley et al. | |
| 7,562,076 B2 | 7/2009 | Kapur | |
| 7,574,436 B2 | 8/2009 | Kapur et al. | |
| 7,574,668 B2 | 8/2009 | Nunez et al. | |
| 7,577,656 B2 | 8/2009 | Kawai et al. | |
| 7,581,166 B2 | 8/2009 | Renger et al. | |
| 7,657,100 B2 | 2/2010 | Gokturk et al. | |
| 7,660,468 B2 | 2/2010 | Gokturk et al. | |
| 7,694,318 B2 | 4/2010 | Eldering et al. | |
| 7,836,054 B2 | 11/2010 | Kawai et al. | |
| 7,860,895 B1 | 12/2010 | Scofield | |
| 7,920,894 B2 | 4/2011 | Wyler | |
| 7,921,107 B2 | 4/2011 | Chang et al. | |
| 7,974,994 B2 | 7/2011 | Li et al. | |
| 7,987,194 B1 | 7/2011 | Walker et al. | |
| 7,987,217 B2 | 7/2011 | Long et al. | |
| 7,991,715 B2 | 8/2011 | Schiff et al. | |
| 8,000,655 B2 | 8/2011 | Wang et al. | |
| 8,036,893 B2 | 10/2011 | Reich | |
| 8,098,934 B2 | 1/2012 | Vincent et al. | |
| 8,112,376 B2 | 2/2012 | Raichelgauz et al. | |
| 8,266,185 B2 | 9/2012 | Raichelgauz et al. | |
| 8,312,031 B2 * | 11/2012 | Raichelgauz | G06F 16/41 707/756 |

(56) References Cited

U.S. PATENT DOCUMENTS

| | | |
|---|---|---|
| 8,315,442 B2 | 11/2012 | Gokturk et al. |
| 8,316,005 B2 | 11/2012 | Moore |
| 8,326,775 B2 | 12/2012 | Raichelgauz et al. |
| 8,345,982 B2 | 1/2013 | Gokturk et al. |
| 8,352,745 B2 | 1/2013 | McKeeth |
| 8,548,828 B1 | 10/2013 | Longmire |
| 8,655,801 B2 | 2/2014 | Raichelgauz et al. |
| 8,677,377 B2 | 3/2014 | Cheyer et al. |
| 8,682,667 B2 | 3/2014 | Haughay |
| 8,688,446 B2 | 4/2014 | Yanagihara |
| 8,706,503 B2 | 4/2014 | Cheyer et al. |
| 8,775,442 B2 | 7/2014 | Moore et al. |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,619 B2 | 10/2014 | Raichelgauz et al. |
| 8,880,539 B2 | 11/2014 | Raichelgauz et al. |
| 8,880,566 B2 | 11/2014 | Raichelgauz et al. |
| 8,886,648 B1 | 11/2014 | Procopio et al. |
| 8,898,568 B2 | 11/2014 | Bull et al. |
| 8,922,414 B2 | 12/2014 | Raichelgauz et al. |
| 8,959,037 B2 | 2/2015 | Raichelgauz et al. |
| 8,990,125 B2 | 3/2015 | Raichelgauz et al. |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,165,406 B1 | 10/2015 | Gray et al. |
| 9,191,626 B2 | 11/2015 | Raichelgauz et al. |
| 9,197,244 B2 | 11/2015 | Raichelgauz et al. |
| 9,218,606 B2 | 12/2015 | Raichelgauz et al. |
| 9,235,557 B2 | 1/2016 | Raichelgauz et al. |
| 9,256,668 B2 | 2/2016 | Raichelgauz et al. |
| 9,323,754 B2 | 4/2016 | Ramanathan et al. |
| 9,330,189 B2 | 5/2016 | Raichelgauz et al. |
| 9,438,270 B2 | 9/2016 | Raichelgauz et al. |
| 2001/0019633 A1 | 9/2001 | Tenze et al. |
| 2001/0056427 A1 | 12/2001 | Yoon et al. |
| 2002/0019881 A1 | 2/2002 | Bokhari et al. |
| 2002/0019882 A1 | 2/2002 | Bokhani |
| 2002/0037010 A1 | 3/2002 | Yamauchi |
| 2002/0038299 A1 | 3/2002 | Zernik et al. |
| 2002/0059580 A1 | 5/2002 | Kalker et al. |
| 2002/0087530 A1 | 7/2002 | Smith et al. |
| 2002/0099870 A1 | 7/2002 | Miller et al. |
| 2002/0107827 A1 | 8/2002 | Benitez-Jimenez et al. |
| 2002/0123928 A1 | 9/2002 | Eldering et al. |
| 2002/0126872 A1 | 9/2002 | Brunk et al. |
| 2002/0129296 A1 | 9/2002 | Kwiat et al. |
| 2002/0143976 A1 | 10/2002 | Barker et al. |
| 2002/0152267 A1 | 10/2002 | Lennon |
| 2002/0157116 A1 | 10/2002 | Jasinschi |
| 2002/0159640 A1 | 10/2002 | Vaithilingam et al. |
| 2002/0161739 A1 | 10/2002 | Oh |
| 2002/0163532 A1 | 11/2002 | Thomas et al. |
| 2002/0174095 A1 | 11/2002 | Lulich et al. |
| 2002/0178410 A1 | 11/2002 | Haitsma et al. |
| 2003/0028660 A1 | 2/2003 | Igawa et al. |
| 2003/0041047 A1 | 2/2003 | Chang et al. |
| 2003/0050815 A1 | 3/2003 | Seigel et al. |
| 2003/0078766 A1 | 4/2003 | Appelt et al. |
| 2003/0086627 A1 | 5/2003 | Berriss et al. |
| 2003/0101150 A1 | 5/2003 | Agnihotri et al. |
| 2003/0126147 A1 | 7/2003 | Essafi et al. |
| 2003/0182567 A1 | 9/2003 | Barton et al. |
| 2003/0191764 A1 | 10/2003 | Richards |
| 2003/0200217 A1 | 10/2003 | Ackerman |
| 2003/0217335 A1 | 11/2003 | Chung et al. |
| 2004/0003394 A1 | 1/2004 | Ramaswamy |
| 2004/0025180 A1 | 2/2004 | Begeja et al. |
| 2004/0068510 A1 | 4/2004 | Hayes et al. |
| 2004/0107181 A1 | 6/2004 | Rodden |
| 2004/0111465 A1 | 6/2004 | Chuang et al. |
| 2004/0117367 A1 | 6/2004 | Smith et al. |
| 2004/0128142 A1 | 7/2004 | Whitham |
| 2004/0128511 A1 | 7/2004 | Sun et al. |
| 2004/0133927 A1 | 7/2004 | Sternberg et al. |
| 2004/0153426 A1 | 8/2004 | Nugent |
| 2004/0215663 A1 | 10/2004 | Liu et al. |
| 2004/0249779 A1 | 12/2004 | Nauck et al. |
| 2004/0260688 A1 | 12/2004 | Gross |
| 2004/0267774 A1 | 12/2004 | Lin et al. |
| 2005/0131884 A1 | 6/2005 | Gross et al. |
| 2005/0144455 A1 | 6/2005 | Haitsma |
| 2005/0177372 A1 | 8/2005 | Wang et al. |
| 2005/0238238 A1 | 10/2005 | Xu et al. |
| 2005/0245241 A1 | 11/2005 | Durand et al. |
| 2005/0281439 A1 | 12/2005 | Lange |
| 2005/0289590 A1 | 12/2005 | Cheok et al. |
| 2006/0004745 A1 | 1/2006 | Kuhn et al. |
| 2006/0013451 A1 | 1/2006 | Haitsma |
| 2006/0020860 A1 | 1/2006 | Tardif et al. |
| 2006/0020958 A1 | 1/2006 | Allamanche et al. |
| 2006/0026203 A1 | 2/2006 | Tan et al. |
| 2006/0031216 A1 | 2/2006 | Semple et al. |
| 2006/0041596 A1 | 2/2006 | Stirbu et al. |
| 2006/0048191 A1 | 3/2006 | Xiong |
| 2006/0064037 A1 | 3/2006 | Shalon et al. |
| 2006/0112035 A1 | 5/2006 | Cecchi et al. |
| 2006/0129822 A1 | 6/2006 | Snijder et al. |
| 2006/0143674 A1 | 6/2006 | Jones et al. |
| 2006/0153296 A1 | 7/2006 | Deng |
| 2006/0159442 A1 | 7/2006 | Kim et al. |
| 2006/0173688 A1 | 8/2006 | Whitham |
| 2006/0184638 A1 | 8/2006 | Chua et al. |
| 2006/0204035 A1 | 9/2006 | Guo et al. |
| 2006/0217818 A1 | 9/2006 | Fujiwara |
| 2006/0217828 A1 | 9/2006 | Hicken |
| 2006/0224529 A1 | 10/2006 | Kermani |
| 2006/0236343 A1 | 10/2006 | Chang |
| 2006/0242130 A1 | 10/2006 | Sadri |
| 2006/0242139 A1 | 10/2006 | Butterfield et al. |
| 2006/0242554 A1 | 10/2006 | Gerace et al. |
| 2006/0247983 A1 | 11/2006 | Dalli |
| 2006/0248558 A1 | 11/2006 | Barton et al. |
| 2006/0253423 A1 | 11/2006 | McLane et al. |
| 2007/0009159 A1 | 1/2007 | Fan |
| 2007/0011151 A1 | 1/2007 | Hagar et al. |
| 2007/0019864 A1 | 1/2007 | Koyama et al. |
| 2007/0027844 A1 | 2/2007 | Toub et al. |
| 2007/0033163 A1 | 2/2007 | Epstein et al. |
| 2007/0038608 A1 | 2/2007 | Chen |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0067682 A1 | 3/2007 | Fang |
| 2007/0071330 A1 | 3/2007 | Oostveen et al. |
| 2007/0074147 A1 | 3/2007 | Wold |
| 2007/0091106 A1 | 4/2007 | Moroney |
| 2007/0130112 A1 | 6/2007 | Lin |
| 2007/0130159 A1 | 6/2007 | Gulli et al. |
| 2007/0168413 A1 | 7/2007 | Barletta et al. |
| 2007/0174320 A1 | 7/2007 | Chou |
| 2007/0195987 A1 | 8/2007 | Rhoads |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0268309 A1 | 11/2007 | Tanigawa et al. |
| 2007/0282826 A1 | 12/2007 | Hoeber et al. |
| 2007/0294295 A1 | 12/2007 | Finkelstein et al. |
| 2008/0046406 A1 | 2/2008 | Seide et al. |
| 2008/0049629 A1 | 2/2008 | Morrill |
| 2008/0072256 A1 | 3/2008 | Boicey et al. |
| 2008/0091527 A1 | 4/2008 | Silverbrook et al. |
| 2008/0152231 A1 | 6/2008 | Gokturk et al. |
| 2008/0163288 A1 | 7/2008 | Ghosal et al. |
| 2008/0165861 A1 | 7/2008 | Wen et al. |
| 2008/0172413 A1 | 7/2008 | Chiu |
| 2008/0172615 A1 | 7/2008 | Igelman et al. |
| 2008/0201299 A1 | 8/2008 | Lehikoinen et al. |
| 2008/0204706 A1 | 8/2008 | Magne et al. |
| 2008/0253737 A1 | 10/2008 | Kimura et al. |
| 2008/0263579 A1 | 10/2008 | Mears et al. |

(56) References Cited

U.S. PATENT DOCUMENTS

| | | |
|---|---|---|
| 2008/0270373 A1 | 10/2008 | Oostveen et al. |
| 2008/0313140 A1 | 12/2008 | Pereira et al. |
| 2008/0313146 A1 | 12/2008 | Wong et al. |
| 2009/0013414 A1 | 1/2009 | Washington et al. |
| 2009/0022472 A1 | 1/2009 | Bronstein et al. |
| 2009/0037408 A1 | 2/2009 | Rodgers |
| 2009/0043637 A1 | 2/2009 | Eder |
| 2009/0089587 A1 | 4/2009 | Brunk et al. |
| 2009/0119157 A1 | 5/2009 | Dulepet |
| 2009/0125544 A1 | 5/2009 | Brindley |
| 2009/0148045 A1 | 6/2009 | Lee et al. |
| 2009/0157575 A1 | 6/2009 | Schobben et al. |
| 2009/0172030 A1 | 7/2009 | Schiff et al. |
| 2009/0175538 A1 | 7/2009 | Bronstein et al. |
| 2009/0245573 A1 | 10/2009 | Saptharishi et al. |
| 2009/0245603 A1 | 10/2009 | Koruga et al. |
| 2009/0253583 A1 | 10/2009 | Yoganathan |
| 2009/0277322 A1 | 11/2009 | Cai et al. |
| 2010/0042646 A1 | 2/2010 | Raichelgauz et al. |
| 2010/0082684 A1 | 4/2010 | Churchill et al. |
| 2010/0104184 A1 | 4/2010 | Bronstein et al. |
| 2010/0125569 A1 | 5/2010 | Nair et al. |
| 2010/0162405 A1 | 6/2010 | Cook et al. |
| 2010/0173269 A1 | 7/2010 | Puri et al. |
| 2010/0211565 A1 | 8/2010 | Lotito |
| 2010/0268524 A1 | 10/2010 | Nath et al. |
| 2010/0306193 A1 | 12/2010 | Pereira et al. |
| 2010/0318493 A1 | 12/2010 | Wessling |
| 2010/0322522 A1 | 12/2010 | Wang et al. |
| 2011/0052063 A1 | 3/2011 | McAuley et al. |
| 2011/0055585 A1 | 3/2011 | Lee |
| 2011/0145068 A1 | 6/2011 | King et al. |
| 2011/0202848 A1 | 8/2011 | Ismalon |
| 2011/0216209 A1* | 9/2011 | Fredlund ............... G06F 21/32 348/211.99 |
| 2011/0246566 A1 | 10/2011 | Kashef et al. |
| 2011/0251896 A1 | 10/2011 | Impollonia et al. |
| 2011/0313856 A1 | 12/2011 | Cohen et al. |
| 2012/0082362 A1 | 4/2012 | Diem et al. |
| 2012/0131454 A1 | 5/2012 | Shah |
| 2012/0150890 A1 | 6/2012 | Jeong et al. |
| 2012/0167133 A1 | 6/2012 | Carroll et al. |
| 2012/0185445 A1 | 7/2012 | Borden et al. |
| 2012/0197857 A1 | 8/2012 | Huang et al. |
| 2012/0239694 A1 | 9/2012 | Avner et al. |
| 2012/0299961 A1 | 11/2012 | Ramkumar et al. |
| 2012/0315009 A1 | 12/2012 | Evans et al. |
| 2012/0330869 A1 | 12/2012 | Durham |
| 2012/0331011 A1 | 12/2012 | Raichelgauz et al. |
| 2013/0031489 A1 | 1/2013 | Gubin et al. |
| 2013/0066856 A1 | 3/2013 | Ong et al. |
| 2013/0067035 A1 | 3/2013 | Amanat et al. |
| 2013/0067364 A1 | 3/2013 | Berntson et al. |
| 2013/0086499 A1 | 4/2013 | Dyor et al. |
| 2013/0089248 A1 | 4/2013 | Remiszewski et al. |
| 2013/0104251 A1 | 4/2013 | Moore et al. |
| 2013/0159298 A1 | 6/2013 | Mason et al. |
| 2013/0173635 A1 | 7/2013 | Sanjeev |
| 2013/0325550 A1 | 12/2013 | Varghese et al. |
| 2013/0332951 A1 | 12/2013 | Gharaat et al. |
| 2013/0346412 A1* | 12/2013 | Raichelgauz ........... G06F 16/41 707/737 |
| 2014/0019264 A1* | 1/2014 | Wachman .......... G06Q 30/0276 705/14.72 |
| 2014/0025692 A1 | 1/2014 | Pappas |
| 2014/0125703 A1 | 5/2014 | Roveta |
| 2014/0147829 A1 | 5/2014 | Jerauld |
| 2014/0152698 A1 | 6/2014 | Kim et al. |
| 2014/0176604 A1 | 6/2014 | Venkitaraman et al. |
| 2014/0188786 A1 | 7/2014 | Raichelgauz et al. |
| 2014/0250032 A1 | 9/2014 | Huang et al. |
| 2014/0282655 A1 | 9/2014 | Roberts |
| 2014/0300722 A1 | 10/2014 | Garcia |
| 2014/0310825 A1 | 10/2014 | Raichelgauz et al. |
| 2014/0330830 A1 | 11/2014 | Raichelgauz et al. |
| 2015/0286742 A1 | 10/2015 | Zhang et al. |
| 2015/0289022 A1 | 10/2015 | Gross |
| 2016/0026707 A1 | 1/2016 | Ong et al. |

FOREIGN PATENT DOCUMENTS

| | | |
|---|---|---|
| WO | 2004019527 A1 | 3/2004 |
| WO | 20070049282 | 5/2007 |
| WO | 2014137337 A1 | 9/2014 |
| WO | 2016040376 A1 | 3/2016 |

OTHER PUBLICATIONS

Brecheisen, et al., "Hierarchical Genre Classification for Large Music Collections", ICME 2006, pp. 1385-1388.

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

Cernansky et al., "Feed-forward Echo State Networks"; Proceedings of International Joint Conference on Neural Networks, Montreal, Canada, Jul. 31-Aug. 4, 2005.

Chuan-Yu Cho, et al., "Efficient Motion-Vector-Based Video Search Using Query by Clip", 2004, IEEE, Taiwan, pp. 1-4.

Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.

Cococcioni, et al, "Automatic Diagnosis of Defects of Rolling Element Bearings Based on Computational Intelligence Techniques", University of Pisa, Pisa, Italy, 2009.

Emami, et al, "Role of Spatiotemporal Oriented Energy Features for Robust Visual Tracking in Video Surveillance, University of Queensland", St. Lucia, Australia, 2012.

Fathy et al., "A Parallel Design and Implementation for Backpropagation Neural Network Using NIMD Architecture", 8th Mediterranean Electrotechnical Corsfe rersce, 19'96. Melecon '96, Date of Conference: May 13-16, 1996, vol. 3, pp. 1472-1475.

Foote, Jonathan, et al. "Content-Based Retrieval of Music and Audio", 1997 Institute of Systems Science, National University of Singapore, Singapore (Abstract).

Freisleben et al., "Recognition of Fractal Images Using a Neural Network", Lecture Notes in Computer Science, 1993, vol. 6861, 1993, pp. 631-637.

Garcia, "Solving the Weighted Region Least Cost Path Problem Using Transputers", Naval Postgraduate School, Monterey, California, Dec. 1989.

Gomes et al., "Audio Watermaking and Fingerprinting: For Which Applications?" University of Rene Descartes, Paris, France, 2003.

Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004.1434102 IEEE Conference Publications, Hong Kong.

Guo et al, "AdOn: An Intelligent Overlay Video Advertising System", SIGIR, Boston, Massachusetts, Jul. 19-23, 2009.

Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.

Ihab Al Kabary, et al., "SportSense: Using Motion Queries to Find Scenes in Sports Videos", Oct. 2013, ACM, Switzerland, pp. 1-3.

International Search Authority: "Written Opinion of the International Searching Authority" (PCT Rule 43bis.1) including International Search Report for International Patent Application No. PCT/US2008/073852; dated Jan. 28, 2009.

International Search Authority: International Preliminary Report on Patentability (Chapter I of the Patent Cooperation Treaty) including "Written Opinion of the International Searching Authority" (PCT Rule 43bis. 1) for the corresponding International Patent Applica-

(56) References Cited

OTHER PUBLICATIONS tion No. PCT/IL2006/001235; dated Jul. 28, 2009.
International Search Report for the corresponding International Patent Application PCT/IL2006/001235; dated Nov. 2, 2008.
IPO Examination Report under Section 18(3) for corresponding UK application No: GB1001219.3, dated Sep. 12, 2011.
Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.
Jaeger, H.: "The "echo state" approach to analysing and training recurrent neural networks", GMD Report, No. 148, 2001, pp. 1-43, XP002466251 German National Research Center for Information Technology.
Jianping Fan et al., "Concept-Oriented Indexing of Video Databases: Towards Semantic Sensitive Retrieval and Browsing", IEEE, vol. 13, No. 7, Jul. 2004, pp. 1-19.
Lau, et al., "Semantic Web Service Adaptation Model for a Pervasive Learning Scenario", 2008 IEEE Conference on Innovative Technologies in Intelligent Systems and Industrial Applications Year: 2008, pp. 98-103, DOI: 10.1109/CITISIA.2008.4607342 IEEE Conference Publications.
Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.
Lin, C.; Chang, S: "Generating Robust Digital Signature for Image/Video Authentication", Multimedia and Security Workshop at ACM Mutlimedia '98; Bristol, U.K., Sep. 1998; pp. 49-54.
Lin, et al., "Robust Digital Signature for Multimedia Authentication: A Summary", IEEE Circuits and Systems Magazine, 4th Quarter 2003, pp. 23-26.
Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.
Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.2014.2359332 IEEE Journals & Magazines.
Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.
Maass, W. et al.: "Computational Models for Generic Cortical Microcircuits", Institute for Theoretical Computer Science, Technische Universitaet Graz, Graz, Austria, published Jun. 10, 2003.
Mandhaoui, et al, "Emotional Speech Characterization Based on Multi-Features Fusion for Face-to-Face Interaction", Universite Pierre et Marie Curie, Paris, France, 2009.
Marti, et al, "Real Time Speaker Localization and Detection System for Camera Steering in Multiparticipant Videoconferencing Environments", Universidad Politecnica de Valencia, Spain, 2011.
May et al., "The Transputer", Springer-Verlag, Berlin Heidelberg, 1989, teaches multiprocessing system.
McNamara, et al., "Diversity Decay in Opportunistic Content Sharing Systems", 2011 IEEE International Symposium on a World of Wireless, Mobile and Multimedia Networks Year: 2011, pp. 1-3, DOI: 10.1109/WoWMoM.2011.5986211 IEEE Conference Publications.
Mei, et al., "Contextual In-Image Advertising", Microsoft Research Asia, pp. 439-448, 2008.
Mei, et al., "VideoSense—Towards Effective Online Video Advertising", Microsoft Research Asia, pp. 1075-1084, 2007.
Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publications.

Morad, T.Y. et al.: "Performance, Power Efficiency and Scalability of Asymmetric Cluster Chip Multiprocessors", Computer Architecture Letters, vol. 4, Jul. 4, 2005 (Jul. 4, 2005), pp. 1-4, XP002466254.
Nagy et al, "A Transputer, Based, Flexible, Real-Time Control System for Robotic Manipulators", UKACC International Conference on Control '96, Sep. 2-5, 1996, Conference 1996, Conference Publication No. 427, IEE 1996.
Nam, et al., "Audio Visual Content-Based Violent Scene Characterization", Department of Electrical and Computer Engineering, Minneapolis, MN, 1998, pp. 353-357.
Natsclager, T. et al.: "The "liquid computer": A novel strategy for real-time computing on time series", Special Issue on Foundations of Information Processing of Telematik, vol. 8, No. 1, 2002, pp. 39-43, XP002466253.
Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.
Odinaev, et al., "Cliques in Neural Ensembles as Perception Carriers", Technion—Israel Institute of Technology, 2006 International Joint Conference on Neural Networks, Canada, 2006, pp. 285-292.
Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.
Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.
Raichelgauz, I. et al.: "Co-evolutionary Learning in Liquid Architectures", Lecture Notes in Computer Science, [Online] vol. 3512, Jun. 21, 2005 (Jun. 21, 2005), pp. 241-248, XP019010280 Springer Berlin / Heidelberg ISSN: 1611-3349 ISBN: 978-3-540-26208-4.
Ribert et al. "An Incremental Hierarchical Clustering", Visicon Interface 1999, pp. 586-591.
Santos, et al., "SCORM-MPEG: an Ontology of Interoperable Metadata for Multimedia and e-Learning", 2015 23rd International Conference on Software, Telecommunications and Computer Networks (SoftCOM) Year 2015, pp. 224-228, DOI: 10.1109/Softcom.2015.7314122 IEEE Conference Publications.
Ma et el.. ("Semantics modeling based image retrieval system using neural networks" 2005 (Year: 2005).
Scheper et al, "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.
Semizarov et al. "Specificity of Short Interfering RNA Determined through Gene Expression Signatures", PNAS, 2003, pp. 6347-6352.
Shih-Fu Chang, et al., "VideoQ: A Fully Automated Video Retrieval System Using Motion Sketches", 1998, IEEE, , New York, pp. 1-2.
The International Search Report and the Written Opinion for PCT/US2016/050471, ISA/RU, Moscow, RU, dated May 4, 2017.
The International Search Report and the Written Opinion for PCT/US2016/054634 dated Mar. 16, 2017, ISA/RU, Moscow, RU.
The International Search Report and the Written Opinion for PCT/US2017/015831, ISA/RU, Moscow, Russia, dated Apr. 20, 2017.
Theodoropoulos et al, "Simulating Asynchronous Architectures on Transputer Networks", Proceedings of the Fourth Euromicro Workshop on Parallel and Distributed Processing, 1996. PDP '96.
Vailaya, et al., "Content-Based Hierarchical Classification of Vacation Images," I.E.E.E: Multimedia Computing and Systems, vol. 1, 1999, East Lansing, MI, pp. 518-523.
Vallet, et al., "Personalized Content Retrieval in Context Using Ontological Knowledge," IEEE Transactions on Circuits and Systems for Video Technology, vol. 17, No. 3, Mar. 2007, pp. 336-346.
Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.

(56) References Cited

OTHER PUBLICATIONS

Verstraeten et al.: "Isolated word recognition with the Liquid State Machine: a case study", Information Processing Letters, Amsterdam, NL, vol. 95, No. 6, Sep. 30, 2005 (Sep. 30, 2005), pp. 521-528, XP005028093 ISSN: 0020-0190.
Wang et al. "A Signature for Content-based Image Retrieval Using a Geometrical Transform", ACM 1998, pp. 229-234.
Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.
Wei-Te Li et al., "Exploring Visual and Motion Saliency for Automatic Video Object Extraction", IEEE, vol. 22, No. 7, Jul. 2013, pp. 1-11.
Whitby-Strevens, "The Transputer", 1985 IEEE, Bristol, UK.
Wilk, et al., "The Potential of Social-Aware Multimedia Prefetching on Mobile Devices", 2015 International Conference and Workshops on Networked Systems (NetSys) Year: 2015, pp. 1-5, DOI: 10.1109/NetSys.2015.7089081 IEEE Conference Publications.
Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.
Yanai, "Generic Image Classification Using Visual Knowledge on the Web," MM'03, Nov. 2-8, 2003, Tokyo, Japan, pp. 167-176.
Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.
Zeevi, Y. et al.: "Natural Signal Classification by Neural Cliques and Phase-Locked Attractors", IEEE World Congress on Computational Intelligence, IJCNN2006, Vancouver, Canada, Jul. 2006 (Jul. 2006), XP002466252.
Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.
Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.
Zhu et al., Technology-Assisted Dietary Assessment. Computational Imaging VI, edited by Charles A. Bouman, Eric L. Miller, Ilya Pollak, Proc. Of SPIE-IS&T Electronic Imaging, SPIE vol. 6814, 681411, Copyright 2008 SPIE-IS&T. pp. 1-10.

\* cited by examiner

SYSTEM AND METHOD FOR CUSTOMIZING IMAGES

CROSS-REFERENCE TO RELATED APPLICATIONS

This application claims the benefit of U.S. Provisional Application No. 62/345,882 filed on Jun. 6, 2016. This application is also a continuation-in-part (CIP) of U.S. patent application Ser. No. 14/050,991 filed on Oct. 10, 2013, now pending, which claims the benefit of U.S. Provisional Application No. 61/860,261 filed on Jul. 31, 2013. The Ser. No. 14/050,991 application is also a CIP of U.S. patent application Ser. No. 13/602,858 filed Sep. 4, 2012, now U.S. Pat. No. 8,868,619, which is a continuation of U.S. patent application Ser. No. 12/603,123, filed on Oct. 21, 2009, now U.S. Pat. No. 8,266,185. The Ser. No. 12/603,123 application is a CIP of:

(1) U.S. patent application Ser. No. 12/084,150 having a filing date of Apr. 7, 2009, now U.S. Pat. No. 8,655,801, which is the National Stage of International Application No. PCT/IL2006/001235, filed on Oct. 26, 2006, which claims foreign priority from Israeli Application No. 171577 filed on Oct. 26, 2005, and Israeli Application No. 173409 filed on Jan. 29, 2006;

(2) U.S. patent application Ser. No. 12/195,863 filed on Aug. 21, 2008, now U.S. Pat. No. 8,326,775, which claims priority under 35 USC 119 from Israeli Application No. 185414, filed on Aug. 21, 2007, and which is also a CIP of the above-referenced U.S. patent application Ser. No. 12/084,150;

(3) U.S. patent application Ser. No. 12/348,888 filed on Jan. 5, 2009, now pending, which is a CIP of the above-referenced U.S. patent application Ser. Nos. 12/084,150 and 12/195,863; and (4) U.S. patent application Ser. No. 12/538,495 filed on Aug. 10, 2009, now U.S. Pat. No. 8,312,031, which is a CIP of the above-referenced U.S. patent application Ser. Nos. 12/084,150; 12/195,863; and Ser. No. 12/348,888.

All of the applications referenced above are herein incorporated by reference for all that they contain.

TECHNICAL FIELD

The present disclosure relates generally to the analysis of multimedia content, and more specifically to automatically customizing images.

BACKGROUND

Computing devices such as smartphones and tablets are often configured to adjust images captured by the computing devices based on, e.g., orientation of the device when captured. For example, a smartphone may be configured to rotate an image based on sensor readings indicating that the smartphone was being held upside down when the image was captured such that the image appears to be properly oriented.

Although some such solutions for adjusting multimedia content exist, these solutions do not typically account for content featured in an image or are unable to accurately and consistently identify specific portions of the image that should be corrected. Accordingly, even images adjusted via existing solutions often appear blurry, unclear, insufficiently bright, or otherwise flawed.

It would be therefore advantageous to provide a solution that overcomes the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for customizing images. The method comprises: causing generation of at least one signature for an input image, wherein each signature represents a concept, wherein each concept is a collection of signatures and metadata representing the concept; comparing the generated at least one signature to at least one signature representing at least one common visual attribute among a plurality of reference images; determining, based on the comparison, whether to customize the input image; and customizing the input image with respect to at least one of the at least one common visual attribute, when it is determined to customize the input image.

Certain embodiments disclosed herein also include a non-transitory computer readable medium having stored thereon causing a processing circuitry to execute a process, the process comprising: causing generation of at least one signature for an input image, wherein each signature represents a concept, wherein each concept is a collection of signatures and metadata representing the concept; comparing the generated at least one signature to at least one signature representing at least one common visual attribute among a plurality of reference images; determining, based on the comparison, whether to customize the input image; and customizing the input image with respect to at least one of the at least one common visual attribute, when it is determined to customize the input image.

Certain embodiments disclosed herein also include a system for signature-enhanced multimedia content searching. The system comprises: a processing circuitry; and a memory, the memory containing instructions that, when executed by the processing circuitry, configure the system to: cause generation of at least one signature for an input image, wherein each signature represents a concept, wherein each concept is a collection of signatures and metadata representing the concept; compare the generated at least one signature to at least one signature representing at least one common visual attribute among a plurality of reference images; determine, based on the comparison, whether to customize the input image; and customize the input image with respect to at least one of the at least one common visual attribute, when it is determined to customize the input image.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
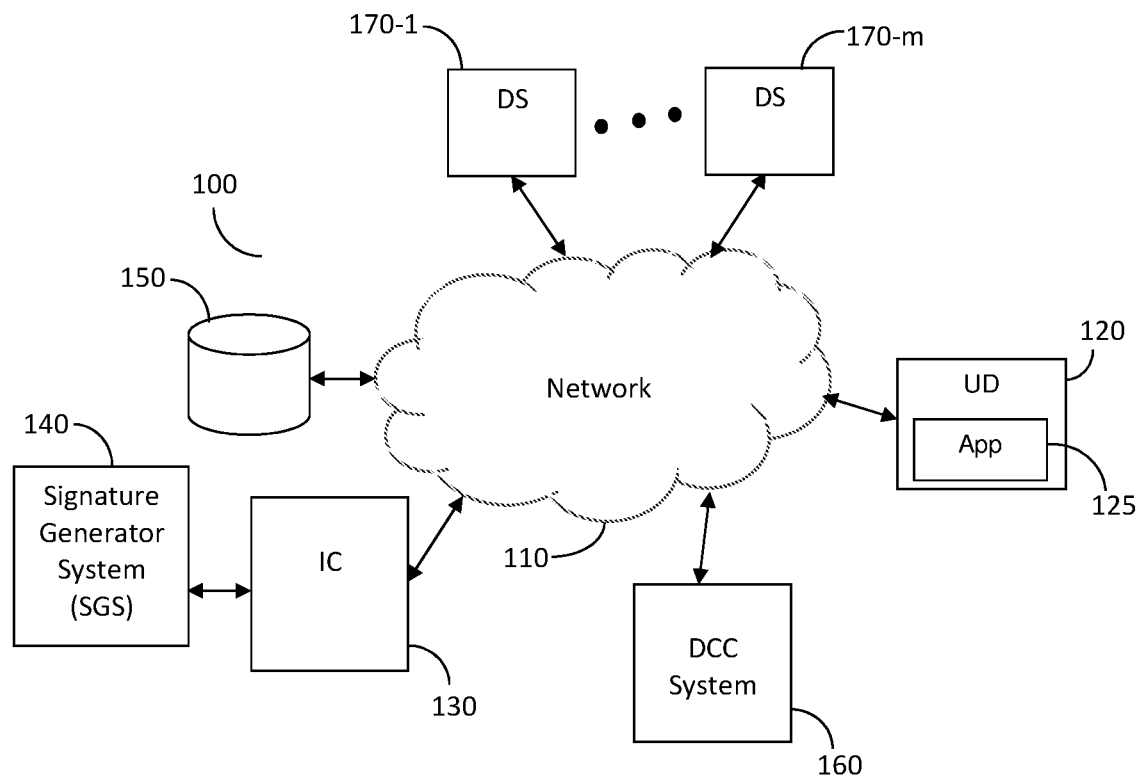
FIG. 1 is a network diagram utilized to describe the various embodiments disclosed herein.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some disclosed features but not to others. In general, unless otherwise indicated, singular elements may be in plural and vice versa with no loss of generality. In the drawings, like numerals refer to like parts through several views.

The various disclosed embodiments include a system and method for customizing images. An input image is received or retrieved. Signatures are generated for the input image. Based on the generated signatures and signatures representing at least one common visual attribute among reference images, it is determined whether to customize the input image. When it is determined that the input image should be customized, at least one customization rule is selected and applied based on the at least one common visual attribute, thereby customizing the input image.

FIG. 1 shows an example network diagram 100 utilized to describe the various disclosed embodiments. The network diagram includes a user device 120, an image customizer (IC) 130, a database 150, a deep content classification (DCC) system 160, and a plurality of data sources 170-1 through 170-m (hereinafter referred to individually as a data source 170 and collectively as data sources 170, merely for simplicity purposes). The network 110 may be the Internet, the world-wide-web (WWW), a local area network (LAN), a wide area network (WAN), a metro area network (MAN), and other networks capable of enabling communication between the elements of the network diagram 100.

The user device 120 may be, but is not limited to, a personal computer (PC), a personal digital assistant (PDA), a mobile phone, a smart phone, a tablet computer, an electronic wearable device (e.g., glasses, a watch, etc.), and other kinds of wired and mobile appliances, equipped with browsing, viewing, capturing, storing, listening, filtering, and managing capabilities enabled as further discussed herein below. The user device 120 may include or be communicatively connected to a local storage (not shown) storing images that may be customized. As a non-limiting example, when the user device 120 is a smart phone including a camera, the local storage may store images captured by the camera.

The user device 120 may further include an application (App) 125 installed thereon. The application 125 may be downloaded from an application repository, such as the AppStore®, Google Play®, or any repositories hosting software applications. The application 125 may be pre-installed in the user device 120. In an embodiment, the application 125 may be a web-browser. The application 125 may be configured to receive selections of input images stored in the user device 120 or one of the data sources 170 via an interface (not shown) of the user device 120 and to send the selected input images or identifiers thereof to the image customizer 130. It should be noted that only one user device 120 and one application 125 are discussed with reference to FIG. 1 merely for the sake of simplicity. However, the embodiments disclosed herein are applicable to a plurality of user devices each having an application installed thereon.

The database 150 stores at least reference images, visual attributes associated with the reference images, customization rules, or a combination thereof. In the example network diagram 100, the image customizer 130 is communicatively connected to the database 150 through the network 110. In other non-limiting configurations, the image customizer 130 may be directly connected to the database 150.

Each of the data sources 170 may store images that may be customized. To this end, the data sources 170 may include, but are not limited to, servers or data repositories of entities such as, for example, social media platforms, remote storage providers (e.g., cloud storage service providers), and any other entities storing images.

The signature generator system (SGS) 140 and the deep-content classification (DCC) system 160 may be utilized by the image customizer 130 to perform the various disclosed embodiments. Each of the SGS 140 and the DCC system 160 may be connected to the image customizer 130 directly or through the network 110. In certain configurations, the DCC system 160 and the SGS 140 may be embedded in the image customizer 130.

In an embodiment, the image customizer 130 is configured to receive or retrieve an input image and to generate at least one signature for the input image. The input image may be stored in, e.g., the user device 120 (e.g., in a local storage of the user device 120), one or more of the data sources 170, or both. In a further embodiment, the image customizer 130 is configured to determine whether to customize the input image based on the generated signatures. In an embodiment, determining whether to customize the input image includes determining whether the input image includes at least one visual attribute that is common among reference images. Each reference is associated with a predetermined positive impression. In a further embodiment, the input image is customized when it is determined that the input image does not include one or more of the common visual attributes.

Each signature represents a concept structure (hereinafter referred to as a "concept"). A concept is a collection of signatures representing elements of the unstructured data and metadata describing the concept. As a non-limiting example, a 'Superman concept' is a signature-reduced cluster of signatures describing elements (such as multimedia elements) related to, e.g., a Superman cartoon: a set of metadata representing proving textual representation of the Superman concept. Techniques for generating concept structures are also described in the above-referenced U.S. Pat. No. 8,266,185.

In an embodiment, the image customizer 130 is configured to send the input image to the signature generator system 140, to the deep content classification system 160, or both. In a further embodiment, the image customizer 130 is configured to receive a plurality of signatures generated to the multimedia content element from the signature generator system 140, to receive a plurality of signatures (e.g., signature reduced clusters) of concepts matched to the multimedia content element from the deep content classification system 160, or both. In another embodiment, the image customizer 130 may be configured to generate the plurality of signatures, identify the plurality of signatures (e.g., by determining concepts associated with the signature reduced clusters matching each input multimedia content element), or a combination thereof.

In an embodiment, determining whether the input image includes at least one visual attribute common among reference images may include matching the generated signatures for the input image to signatures representing concepts of predetermined visual attributes associated with reference images having positive impressions. The visual attributes of an image may include, but are not limited to, lighting conditions, proportion, orientation, color gradient, facial expressions, background characteristics, and the like. The process of matching between signatures of multimedia content elements is discussed in detail below with respect to FIGS. 4 and 5.

As a non-limiting example for determining whether the input image includes at least one common visual attribute, the generated signatures may be matched to signatures representing the concepts "blue eyes," "green eyes," and "brown eyes," respectively, each of which is a predetermined visual attribute associated with reference images. If the generated signatures do not match the signatures of any of the positive impression concepts (e.g., if the generated signatures include signatures representing the concept "red eyes"), it is determined that the input image does not include the at least one common visual attribute and, therefore, that the input image is to be customized.

In a further embodiment, the matching between the generated signatures and signatures representing concepts associated with positive impressions may be performed with respect to sets of positive impression concepts, where each set includes at least one concept related to a different type of visual attribute. To this end, the matching may include matching the generated signatures to signatures of each set of positive impression concepts, where the image is to be customized if the generated signatures do not match any of the signatures of at least one of the sets of positive impression concepts.

Types of visual attributes may include, but are not limited to, attributes related to different facial features (e.g., eyes, cheeks, lips, hair, etc.), attributes related to different characteristics of the image (e.g., clarity, brightness, color, etc.), or a combination thereof. Matching the generated signatures to different sets of signatures representing positive impression concepts allows for determining different potential customizations of the input image. As a non-limiting example, the generated signatures may be matched to a set of signatures representing positive impression brightness of eyes (e.g., bright appearance of eyes) as well as to a set of signatures representing positive impression clarity images (e.g., images that are not blurry), where it is determined that the input image is to be customized if at least a portion of the generated signatures do not match signatures representing bright eyes, clear face images, or both.

In an optional embodiment, determining whether to customize the input image may further include determining whether the input image is a self-portrait image. A self-portrait image, typically referred to as a "selfie," is typically taken using a camera or other capturing device (not shown) disposed on or in the screen side of the user device 120 such that the user of the user device 120 can see a display of the user device 120 while the self-portrait image is captured. The capturing device disposed on or in the screen side of the user device 120 may be a lower resolution capturing device (e.g., as compared to a rear side capturing device) and, therefore, self-portrait images captured by the user device 120 may be lower resolution images. In some embodiments, only self-portrait images may be customized.

In an embodiment, when it is determined that the input image is to be customized, one or more customization rules is applied to the input image in order to customize the image. The customization rules include rules for manipulating images, portions thereof, and the like. As non-limiting examples, the customization rules may include rules for brightening, increasing clarity, altering colors, altering facial expressions, altering backgrounds, re-orienting images, proportionally resizing images, and the like. Which customization rules to be applied may be further based on visual attributes of the input image and common visual attributes of the reference images. As a non-limiting example, a customization rule for brightening cheeks shown in an image may be applied when visual attributes of the input multimedia content element (e.g., as indicated based on the generated signatures) include a first cheek brightness and the common visual attributes include a second cheek brightness, where the second cheek brightness is higher than the first cheek brightness.

In an embodiment, the image customizer 130 may be configured to determine the common visual attributes based on a plurality of reference images associated with positive impressions. The reference images may include images associated with predetermined positive impressions. A non-limiting example method for determining positive impression multimedia content elements is described in co-pending U.S. patent application Ser. No. 15/463,414 filed on Mar. 20, 2017, assigned to the common assignee, the contents of which are hereby incorporated by reference.

In an embodiment, determining the common visual attributes may include generating at least one signature for each reference image and identifying, for each reference image, at least one visual attribute concept, where each visual attribute concept represents a visual attribute. In a further embodiment, each common visual attribute is an attribute represented by a visual attribute concept that is common among two or more of the reference images. In another embodiment, the common visual attributes may be determined based on metadata of the reference images.

It should further be noted that using signatures generated for images enable identification of visual attributes of the images, because the signatures generated for the images, according to the disclosed embodiments, allow for recognition and classification of images.

Figure 2:
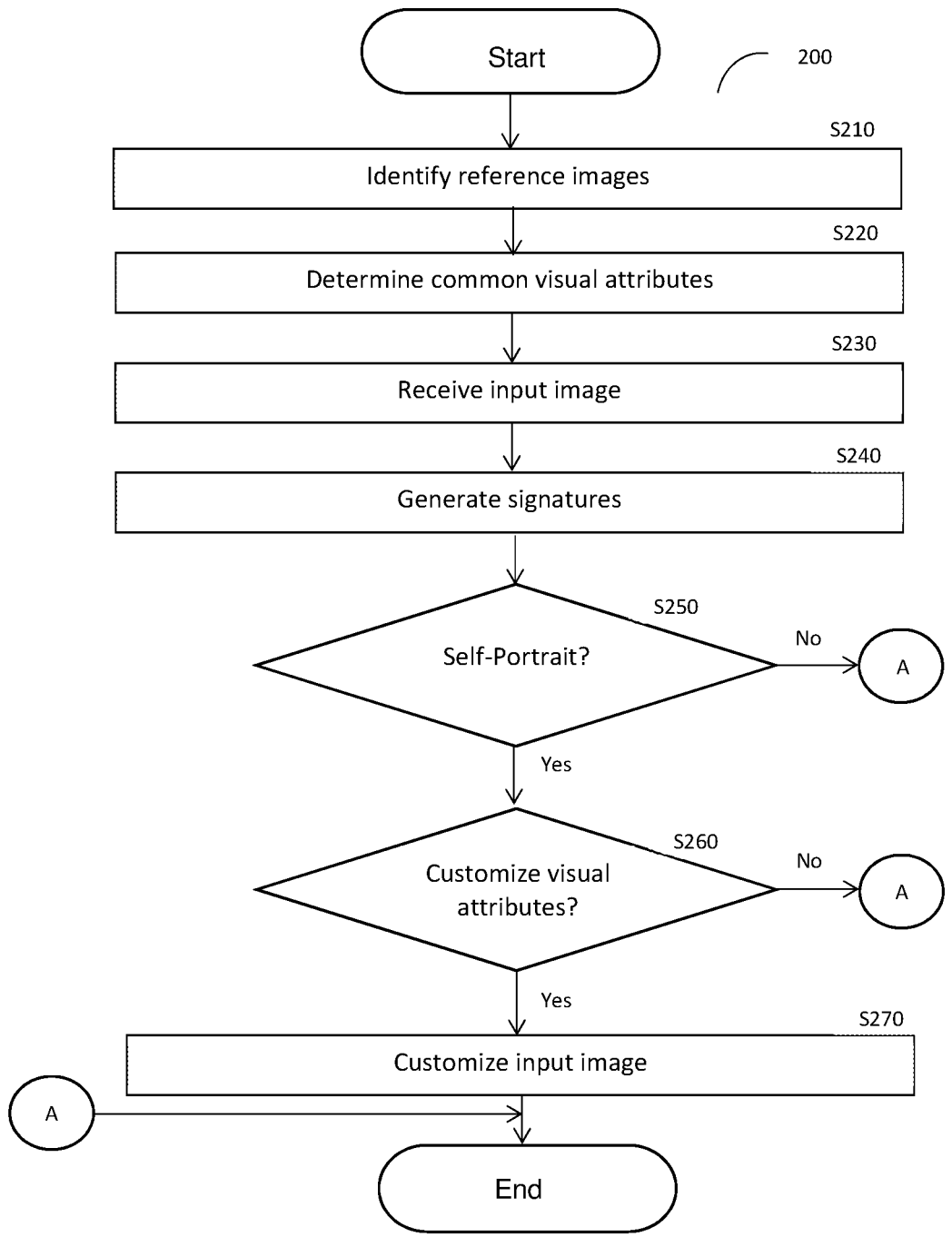
FIG. 2 is a flowchart illustrating a method for customizing images according to an embodiment.

FIG. 2 is an example flowchart 200 illustrating a method for customizing images according to an embodiment. In an embodiment, the method may be performed by the image customizer 130, FIG. 1.

At S210, a plurality of reference images associated with positive impressions is identified. The identified reference images may be or may include images that were previously determined to be associated with positive impressions. Alternatively or collectively, S210 may include determining impressions of a plurality of images to identify images having positive impressions based on signatures of the plurality of images. An example method for determining impressions of images based on signatures is described further in the above-mentioned U.S. patent application Ser. No. 15/463,414. Utilizing reference images associated with positive impressions allows for customizing input images so as to maximize likelihood of positive impressions of the customized images.

At S220, the identified plurality of reference images is analyzed to determine at least one common visual attribute among the plurality of reference images. The visual attributes of an image may include, but are not limited to, lighting conditions, proportion, orientation, color gradient, facial expressions, background characteristics, and the like. In an embodiment, the at least one common visual attribute may be determined based on signatures generated for the reference images (e.g., as described further herein below with respect to FIGS. 4 and 5). In a further embodiment, S220 may include determining, for each reference image, at least one concept representing visual attributes of the reference image, where each common visual attribute is represented by a concept that is related to two or more of the reference images. In yet a further embodiment, S220 may include matching among signatures representing the concepts of each reference image.

At S230, an input image is received. Alternatively, the input image may be retrieved from, e.g., a user device, one or more data sources, both, and the like.

At S240, at least one signature is generated for the input multimedia content element. The signature(s) are generated by a signature generator system (e.g., the SGS 140) as described herein below with respect to FIGS. 4 and 5. Each signature represents a concept structure (hereinafter referred to as a "concept"). A concept is a collection of signatures representing elements of the unstructured data and metadata describing the concept.

At optional S250, it may be determined whether the input image is a self-portrait image and, if so, execution continues with S260; otherwise, execution terminates. Consequently, in some implementations, only self-portrait images may be customized. An example method for determining whether images are self-portrait images is described further herein below with respect to FIG. 3.

At S260, it is determined whether the input image is to be customized with respect to at least one visual attribute of the input image and, if so, execution continues with S270; otherwise, execution terminates. In an embodiment, S260 includes comparing the signatures generated for the input image to signatures representing common concepts of the reference images, where the input image may be customized when one or more of the common concept signatures does not match any of the input image signatures. Signatures may be determined as matching when, for example, the signatures match above a predetermined threshold. As a non-limiting example, when the input image is oriented such that a face shown in the image is rotated clockwise and common concepts among reference images include a concept indicating unrotated images, a signature of the unrotated image concept may not match any of the generated signatures for the input image. Accordingly, it is determined that the input image is to be customized with respect to the clockwise rotation attribute.

In a further embodiment, the matching between the generated signatures and signatures representing concepts associated with positive impressions may be performed with respect to sets of positive impression concepts as described further herein above with respect to FIG. 1. Each set includes at least one concept related to a different type of visual attribute. To this end, S260 may include matching the generated signatures to signatures of each set of positive impression concepts, where the image is to be customized if the generated signatures do not match any of the signatures of at least one of the sets of positive impression concepts.

Types of visual attributes may include, but are not limited to, attributes related to different facial features (e.g., eyes, cheeks, lips, hair, etc.), attributes related to different characteristics of the image (e.g., clarity, brightness, color, etc.), or a combination thereof. Matching the generated signatures to different sets of signatures representing positive impression concepts allows for determining different potential customizations of the input image. For example, an input image may be customized with respect to eyes (e.g., by brightening eyes or removing red eye), with respect to cheeks (e.g., by altering the color of cheeks to appear rosy), and with respect to the clarity of the overall image (e.g., by reducing blurring due to camera shaking), based on comparison of the generated signatures to signatures representing positive impression visual attributes related to eyes, cheeks, and overall image clarity, respectively.

At S270, the input image is customized. In an embodiment, S270 includes applying at least one customization rule defining instructions for customizing the input image. In a further embodiment, S270 may include determining the at least one customization rule to be applied based on at least one visual attribute of the input image and the at least one common visual attribute of the reference images.

The customization rules include rules for manipulating at least portions of images. As non-limiting examples, the customization rules may include rules for brightening, increasing clarity, altering colors, altering facial expressions, altering backgrounds, re-orienting images, proportionally resizing images, and the like.

As a non-limiting example, a common visual attribute indicating green eyes that appear bright among a plurality of reference images is determined. An input image showing a face of a person having green eyes that appear dark is received. Signatures are generated for the input image. Based on the signatures, it is determined that the input image shows a person's face and, therefore, is a self-portrait image. Signatures representing the dark-appearing green eyes are compared to signatures representing the common visual attributes including the bright-appearing green eyes, and based on the comparison, it is determined that the input image should be customized. Customization rules for brightening dark-appearing eyes are selected and applied, thereby customizing the image.

It should be noted that FIG. 2 is described as including identifying reference images and common visual attributes thereof merely for example purposes, and that the determination of whether to customize the input image may be based on predetermined common visual attributes without departing from the scope of the disclosure. As a non-limiting example, a set of signatures representing concepts of common visual attributes may be received or retrieved, where signatures of the list may be compared to the generated signatures for the input image to determine whether the input image includes the common visual attributes.

Figure 3:
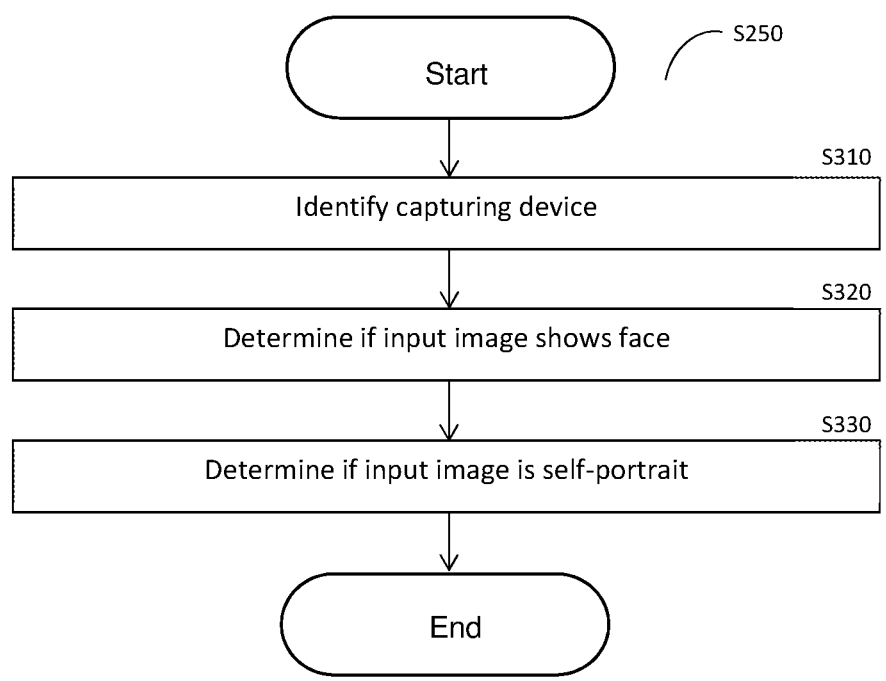
FIG. 3 is a flowchart illustrating a method for identifying self-portrait images according to an embodiment.

FIG. 3 depicts an example flowchart S250 illustrating a method for determining if an input image is a self-portrait image according to an embodiment.

At S310, a capturing device that captured the input image is identified. The capturing device may be identified as a particular capturing device, a particular type of capturing device (e.g., a high-resolution camera, a low-resolution camera, etc.), a capturing device facing in particular direction (e.g., disposed in or on the front or rear side of a user device), a combination thereof, and the like. The capturing device may be or may include a camera or other sensor configured to capture images. In an embodiment, S310 includes analyzing metadata associated with the input image to identify the capturing device. To this end, in a further embodiment, S310 may include identifying, based on the metadata, characteristics of the capturing device such as, but not limited to, resolution, quality, colors, capturing device identifiers, and the like.

At S320, it is determined whether a face is identified in the input image. In an embodiment, S320 may include comparing signatures generated for the input image (e.g., the signatures generated at S240, FIG. 2) to a signature representing a "face" concept, where it is determined that a face is identified in the input image when at least one signature of the input images matches the "face" concept signature above a predetermined threshold.

At S330, it is determined if the input image is a self-portrait image. In an embodiment, the self-portrait determination is based on the identified capturing device, the identified face, or both.

It should be noted that the steps of FIG. 3 are described in a particular order merely for example purposes and without limitation on the disclosed embodiments. Other orders may be equally utilized without departing from the scope of the disclosure. In particular, identifying the identifying a person's face may be performed prior to identifying the capturing device without departing from the scope of the disclosure. It should further be noted that either S310 or S320 may be optional such that, e.g., it may be determined whether the input image is a self-portrait image based solely on the results of S310 or of S320. To this end, when it is determined that, e.g., the input image is a self-portrait image based on the identification of the capturing device, S250 may not include identifying a face within the input image.

Figure 4:
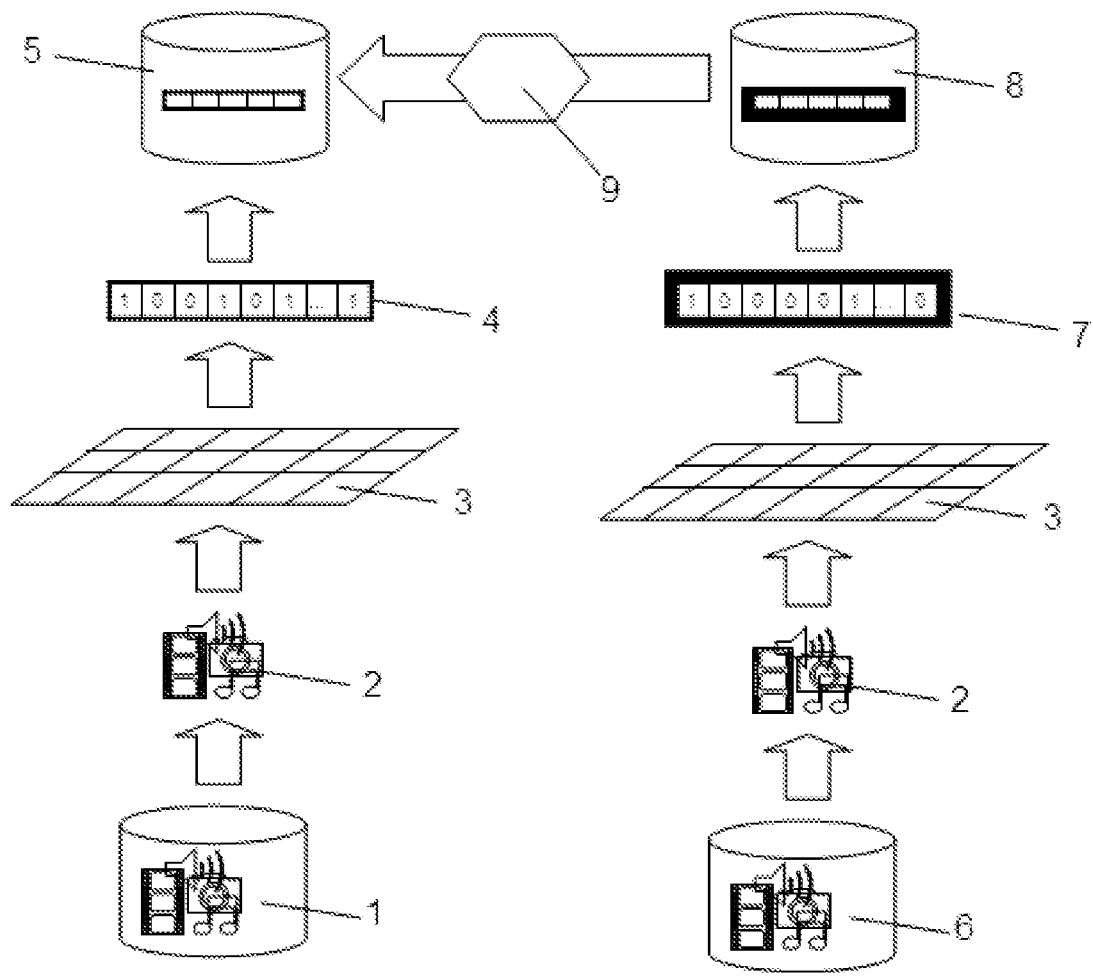
FIG. 4 is a block diagram depicting the basic flow of information in the signature generator system.
Figure 5:
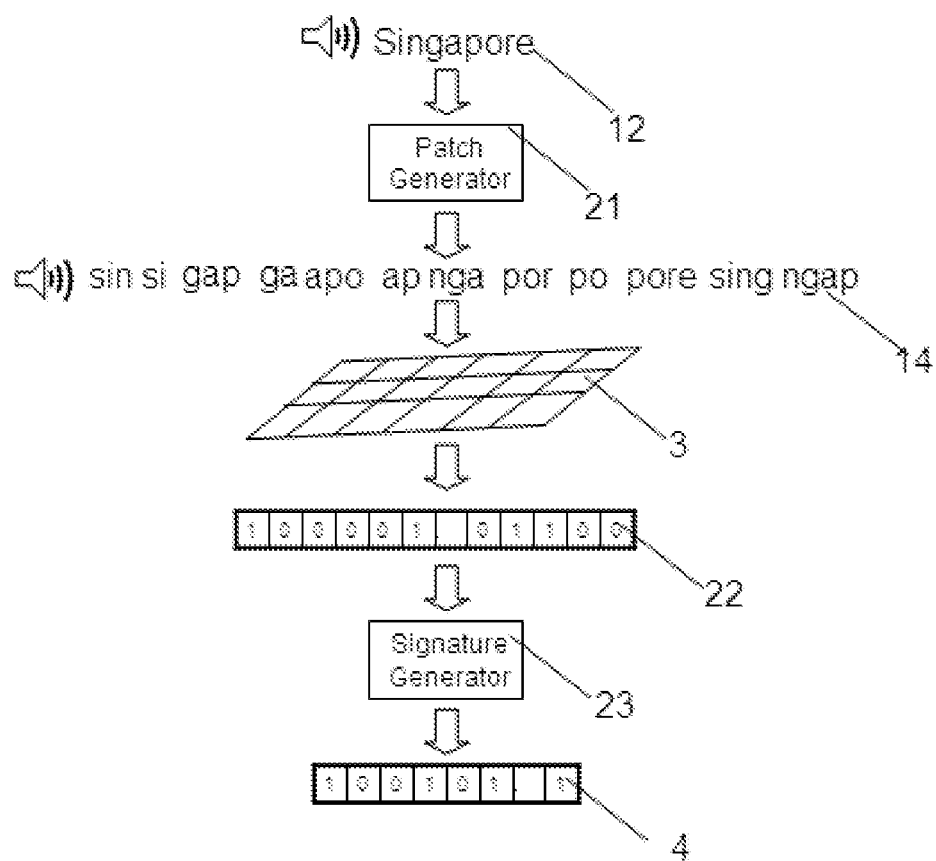
FIG. 5 is a diagram showing the flow of patches generation, response vector generation, and signature generation in a large-scale speech-to-text system.

FIGS. 4 and 5 illustrate the generation of signatures for the multimedia content elements by the SGS 140 according to one embodiment. An exemplary high-level description of the process for large scale matching is depicted in FIG. 4. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Finally, Target Robust Signatures and/or Signatures are effectively matched, by a matching algorithm 9, to Master Robust Signatures and/or Signatures database to find all matches between the two databases.

To demonstrate an example of the signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames. In an embodiment, the SGS 140 is configured with a plurality of computational cores to perform matching between signatures.

The Signatures' generation process is now described with reference to FIG. 5. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the image customizer 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame 'i' is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i = \{n_i\}$ ($1 \leq i \leq L$) may consist of a single leaky integrate-to-threshold unit (LTU) node or more nodes. The node $n_i$ equations are:

$$V_i = \sum_j w_{ij} k_j$$

$$n_i = \theta(V_i - Th_x)$$

where, $\theta$ is a Heaviside step function; $w_{ij}$ is a coupling node unit (CNU) between node i and image component j (for example, grayscale value of a certain pixel j); kj is an image component 'j' (for example, grayscale value of a certain pixel j); Thx is a constant Threshold value, where 'x' is 'S' for Signature and 'RS' for Robust Signature; and Vi is a Coupling Node Value.

The Threshold values Thx are set differently for Signature generation and for Robust Signature generation. For example, for a certain distribution of Vi values (for the set of nodes), the thresholds for Signature ($Th_S$) and Robust Signature ($Th_{RS}$) are set apart, after optimization, according to at least one or more of the following criteria:

1: For: $V_i > Th_{RS}$
   $1 - p(V > Th_S) - 1 - (1-\varepsilon)^l \ll 1$ i.e., given that l nodes (cores) constitute a Robust Signature of a certain image I, the probability that not all of these l nodes will belong to the Signature of same, but noisy image, $\tilde{I}$ is sufficiently low (according to a system's specified accuracy).

2: $p(V_i > Th_{RS}) \approx l/L$ i.e., approximately l out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the Signature generation can be found in U.S. Pat. Nos. 8,326, 775 and 8,312,031, assigned to common assignee, which are hereby incorporated by reference for all the useful information they contain.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

A detailed description of the Computational Core generation and the process for configuring such cores is discussed in more detail in the above-referenced U.S. Pat. No. 8,655, 801.

Figure 6:
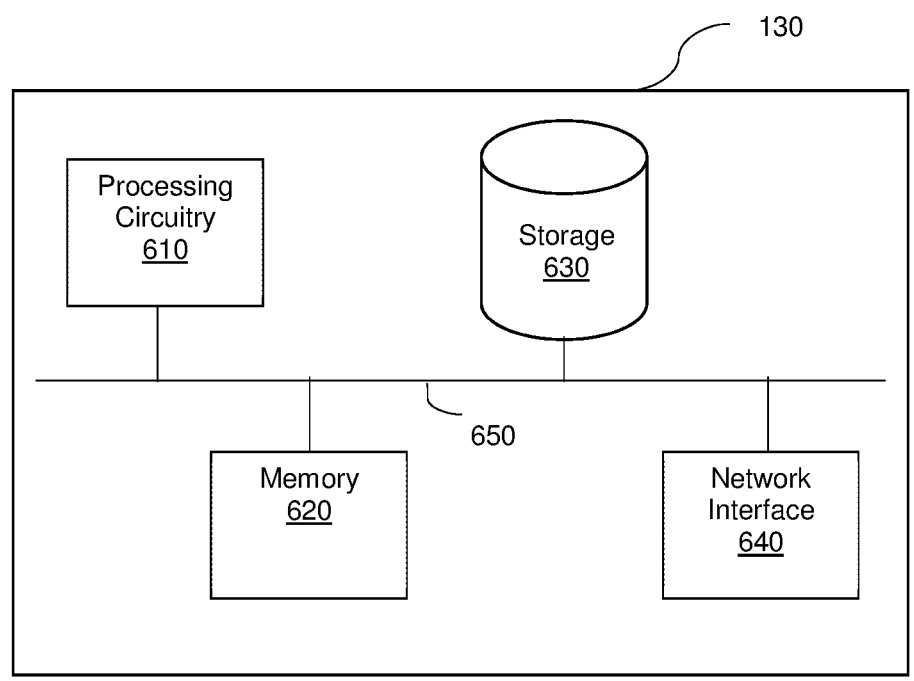
FIG. 6 is a schematic diagram of an image customizer according to an embodiment.

FIG. 6 is an example schematic diagram of the image customizer 130 according to an embodiment. The image customizer 130 includes a processing circuitry 610 coupled to a memory 620, a storage 630, and a network interface 640. In an embodiment, the components of the image customizer 130 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information. In an embodiment, the processing circuitry 610 may be realized as an array of at least partially statistically independent computational cores. The properties of each computational core are set independently of those of each other core, as described further herein above.

The memory 620 may be volatile (e.g., RAM, etc.), non-volatile (e.g., ROM, flash memory, etc.), or a combination thereof. In one configuration, computer readable instructions to implement one or more embodiments disclosed herein may be stored in the storage 630.

In another embodiment, the memory 620 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein. Specifically, the instructions, when executed, cause the processing circuitry 610 to customize images as described herein.

The storage 630 may be magnetic storage, optical storage, and the like, and may be realized, for example, as flash memory or other memory technology, CD-ROM, Digital Versatile Disks (DVDs), or any other medium which can be used to store the desired information.

The network interface 640 allows the image customizer 130 to communicate with the signature generator system 140 for the purpose of, for example, sending multimedia content elements, receiving signatures, and the like. Further, the network interface 640 allows the image customizer 130 to receive input images, send and store customized images, and the like.

It should be understood that the embodiments described herein are not limited to the specific architecture illustrated in FIG. 6, and other architectures may be equally used without departing from the scope of the disclosed embodiments. In particular, the image customizer 130 may further include a signature generator system configured to generate signatures as described herein without departing from the scope of the disclosed embodiments.

It should also be understood that various embodiments described herein are discussed with respect to customizing images merely for simplicity purposes and without limitation on the disclosed embodiments. In some embodiments, the customization may be performed for other visual multimedia content elements such as, but not limited to, a graphic, a video stream, a video clip, a video frame, an image of signals (e.g., spectrograms, phasograms, scalograms, etc.), a combination thereof, or a portion thereof. As a non-limiting example, a video frames of a video featuring a person singing may be brightened such that video frames showing the person's face are brightened.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the disclosed embodiments and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for customizing an image, comprising:

causing generation of at least one signature for an input image, wherein each signature represents a concept, wherein each concept is a collection of signatures and metadata representing the concept;

comparing the generated at least one signature to at least one signature representing at least one common visual attribute among a plurality of reference images;

determining, based on the comparison, whether to customize the input image; and customizing the input image with respect to at least one of the at least one common visual attribute, when it is determined to customize the input image: wherein the at least one common visual attribute includes at least one of: a lighting condition, a proportion, an orientation, a color gradient, a facial expression, and a background characteristic.

2. The method of claim 1, wherein at least one of the generated at least one signature represents a visual attribute of the input image, wherein customizing the input image further comprises:

determining, based on the at least one visual attribute of the input image and the at least one common visual attribute, at least one customization rule to be applied to the input image; and applying the determined at least one customization rule to the input image, each customization rule defining a manipulation of at least a portion of an image.

3. The method of claim 1, Wherein the at least one common visual attribute includes a plurality of sets of common visual attributes, wherein each set is related to a different type of visual attribute, further comprising:

comparing the generated at least one signature to a plurality of signatures representing common visual attributes of each set to determine at least one non-matching set, wherein the input image is customized with respect to each type of visual attribute related to one of the at least one non-matching set.

4. The method of claim 1, further comprising:

analyzing the plurality of reference images to determine the at least one common visual attribute.

5. The method of claim 4, wherein analyzing the plurality of reference images further comprises:

for each reference image, determining, based on at least one signature generated for the reference image, a plurality of visual attribute concepts, each visual attribute concept representing a visual attribute of the reference image, wherein the determined at least one common visual attribute includes each visual attribute represented by at least two of the determined visual attribute concepts.

6. The method of claim 1, wherein determining whether to customize the input image further comprises:

determining whether the input image is a self-portrait image, wherein it is determined to customize the input image when the input image is a self-portrait image.

7. The method of claim 6, wherein determining whether the input image is a self-portrait image further comprises:

identifying a capturing device that captured the input image, wherein the determination of whether the input image is a self-portrait image is based on the identified capturing device.

8. The method of claim 6, wherein determining whether the input image is a self-portrait image further comprises:

determining, based on the generated at least one signature, whether at least one face is shown in the input image, wherein it is determined to that the input image is a self-portrait image when it is determined that at least one face is shown in the input image.

9. The method of claim 1, wherein each signature is generated by a signature generator system, wherein the signature generator system includes a plurality of at least partially statistically independent computational cores, wherein the properties of each core are set independently of the properties of each other core.

10. A non-transitory computer readable medium having stored thereon instructions for causing a processing circuitry to execute a process, the process comprising:

causing generation of at least one signature for an input image, wherein each signature represents a concept, wherein each concept is a collection of signatures and metadata representing the concept;

comparing the generated at least one signature to at least one signature representing at least one common visual attribute among a plurality of reference images;

determining, based on the comparison, whether to customize the input image; and customizing the input image with respect to at least one of the at least one common visual attribute, when it is determined to customize the input image; wherein the at least one common visual attribute includes at least one of: a lighting condition, a proportion, an orientation, a color gradient, a facial expression, and a background characteristic.

11. A system for determining driving decisions based on multimedia content elements, comprising:

a processing circuitry; and a memory connected to the processing circuitry, the memory containing instructions that, when executed by the processing circuitry, configure the system to:

cause generation of at least one signature for an input image, wherein each signature represents a concept, wherein each concept is a collection of signatures and metadata representing the concept;

compare the generated at least one signature to at least one signature representing at least one common visual attribute among a plurality of reference images;

determine, based on the comparison, whether to customize the input image; and customize the input image with respect to at least one of the at least one common visual attribute, when it is determined to customize the input image; wherein the at least one common visual attribute includes at least one of: a lighting condition, a proportion, an orientation, a color gradient, a facial expression, and a background characteristic.

12. The system of claim 11, wherein at least one of the generated at least one signature represents a visual attribute of the input image, wherein the system is further configured to:

determine, based on the at least one visual attribute of the input image and the at least one common visual attribute, at least one customization rule to be applied to the input image; and apply the determined at least one customization rule to the input image, each customization rule defining a manipulation of at least a portion of an image.

13. The system of claim 11, wherein the at least one common visual attribute includes a plurality of sets of common visual attributes, wherein each set is related to a different type of visual attribute, wherein the system is further configured to:

compare the generated at least one signature to a plurality of signatures representing common visual attributes of each set to determine at least one non-matching set, wherein the input image is customized with respect to each type of visual attribute related to one of the at least one non-matching set.

14. The system of claim 11, wherein the system is further configured to: analyze the plurality of reference images to determine the at least one common visual attribute.

15. The system of claim 14, wherein the system is further configured to: for each reference image, determine, based on at least one signature generated for the reference image, a plurality of visual attribute concepts, each visual attribute concept representing a visual attribute of the reference image, wherein the determined at least one common visual attribute includes each visual attribute represented by at least two of the determined visual attribute concepts.

16. The system of claim 11, wherein the system is further configured to:
 determining whether the input image is a self-portrait image, wherein it is determined to customize the input image when the input image is a self-portrait image.

17. The system of claim 16, wherein the system is further configured to: identify a capturing device that captured the input image, wherein the determination of whether the input image is a self-portrait image is based on the identified capturing device.

18. The system of claim 16, wherein the system is further configured to:
 determine, based on the generated at least one signature, Whether at least one face is shown in the input image, wherein it is determined to that the input image is a self-portrait image when it is determined that at least one face is shown in the input image.

19. The system of claim 11, wherein each signature is generated by a signature generator system, wherein the signature generator system includes a plurality of at least partially statistically independent computational cores, wherein the properties of each core are set independently of the properties of each other core.

\* \* \* \* \*